United States Patent [19]

Boutaghou

[11] Patent Number: 5,774,305
[45] Date of Patent: Jun. 30, 1998

[54] HEAD GIMBAL ASSEMBLY TO REDUCE SLIDER DISTORTION DUE TO THERMAL STRESS

[75] Inventor: Zine-Eddine Boutaghou, Rochester, Minn.

[73] Assignee: Seagate Technology, Inc., Scotts Valley, Calif.

[21] Appl. No.: 486,009

[22] Filed: Jun. 7, 1995

[51] Int. Cl.[6] .............................. G11B 5/48; G11B 21/16
[52] U.S. Cl. ............................................. 360/104
[58] Field of Search ..................................... 360/103, 104

[56] References Cited

U.S. PATENT DOCUMENTS

| | | | |
|---|---|---|---|
| 4,700,250 | 10/1987 | Kuriyama | 360/104 |
| 5,333,085 | 7/1994 | Prentice et al. | 360/104 |
| 5,452,158 | 9/1995 | Harrison et al. | 360/104 |
| 5,499,153 | 3/1996 | Uemura et al. | 360/103 |
| 5,612,840 | 3/1997 | Hiraoka et al. | 360/104 |

FOREIGN PATENT DOCUMENTS 2-31390  2/1990  Japan ..................................... 360/104

*Primary Examiner*—Stuart S. Levy
*Assistant Examiner*—William R. Korzuch
*Attorney, Agent, or Firm*—Westman, Champlin & Kelly, P.A.

[57] ABSTRACT

The present invention is directed to a head gimbal assembly which effectively reduces the membrane forces and membrane moments generated between the slider and the gimbal by adding geometric patterns distributed on the gimbal support. The head gimbal assembly of the present invention comprises the support coupled to the slider at an interface wherein the support includes a plurality of spaced apart markings or etchings at the interface. The head gimbal assembly of the present invention provides for localized deformations of the slider which avoid the bulk deformations that cause undesirable transducer displacement.

16 Claims, 5 Drawing Sheets

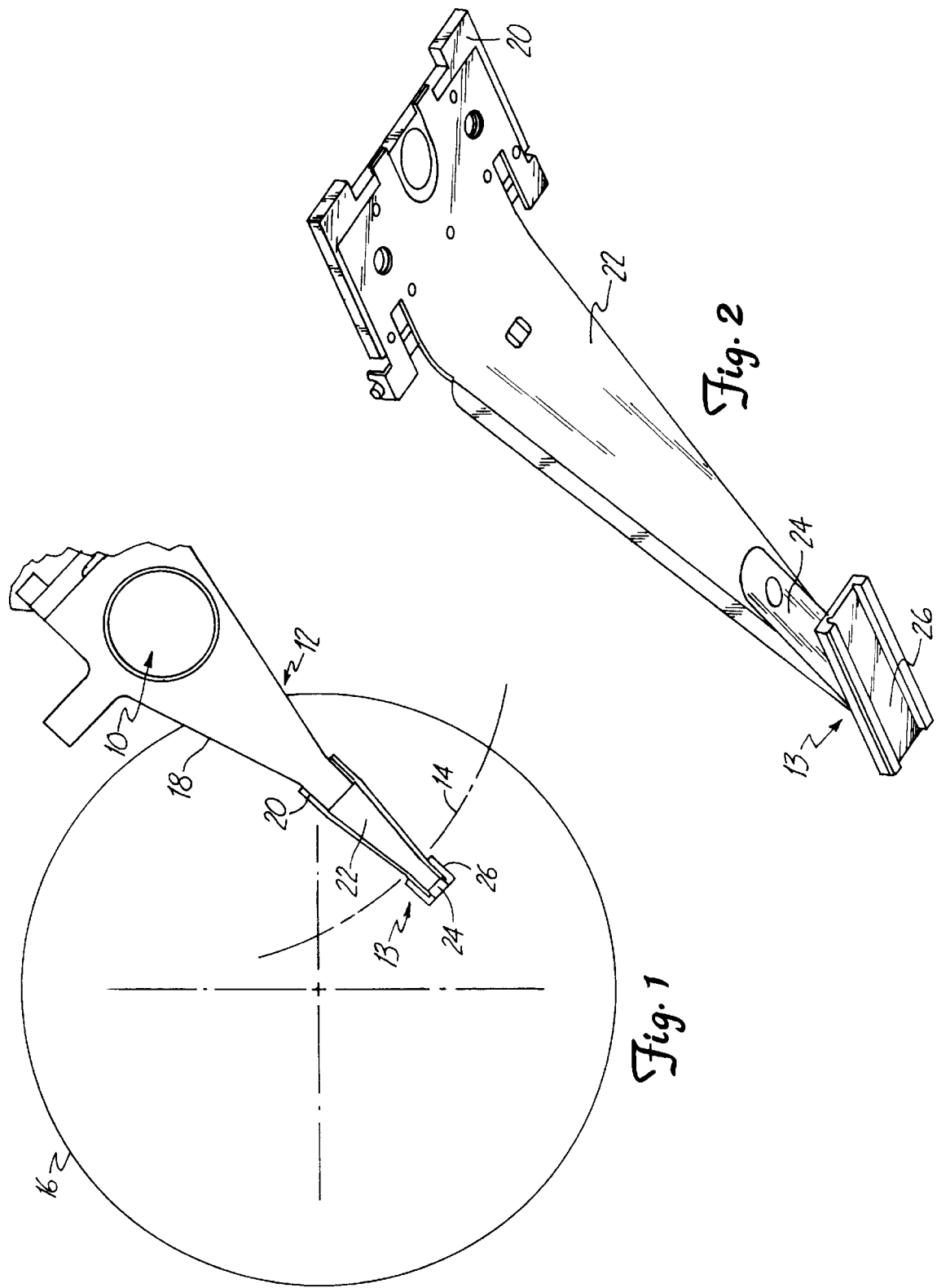

HEAD GIMBAL ASSEMBLY TO REDUCE SLIDER DISTORTION DUE TO THERMAL STRESS

BACKGROUND OF THE INVENTION

The present invention relates to a gimbal for supporting a hydrodynamic air bearing slider over a rotating magnetic medium. More specifically, the present invention relates to a gimbal which reduces slider distortion due to thermal stress.

Disc drives are the primary devices employed for mass storage of computer programs and data. The advantages of disc drive technology over other means of data storage include a lower cost per unit of storage capacity and a generally higher transfer rate. Within a disc drive, a load beam supports a hydrodynamic air bearing slider close to a rotating magnetic disc. The load beam supplies a downward force that counteracts the hydrodynamic lifting force developed by the slider's air bearing. The slider carries a magnetic transducer for communication with individual bit positions on the rotating magnetic disc.

A gimbal is positioned between the load beam and the slider. The gimbal resiliently supports the slider and allows it to pitch and roll while it follows the topography of the rotating disc. As such, the gimbal is a crucial element in a magnetic disc drive unit.

Typically, the gimbal is welded to the load beam and is connected to the slider by an adhesive to form a head gimbal assembly. For example, with various types of gimbals such as "ring-type" and "beam-type" gimbals, the slider is adhesively bonded to a central tongue, or "support" as it is generally called, which is supported by resilient beams. This adhesive bond presents several concerns to a gimbal designer.

Among these concerns is slider distortion due to thermal stresses. The principle of thermal expansion states that essentially all solids expand in volume when the temperature is raised. When the temperature is increased, the average distance between atoms increases, which leads to an expansion of the whole solid body. The amount of thermal expansion is dependent upon a property called the coefficient of thermal expansion which has different values for different materials. In other words, different materials expand at different rates for a given temperature change.

In a typical head gimbal assembly, the gimbal is made from stainless steel which has a substantially different coefficient of thermal expansion than the slider, which is typically made from alumina. Because the coefficients of thermal expansion are different and the slider is bonded to the gimbal, temperature changes cause a net elastic displacement at the support/slider interface which is responsible for bending and twisting of the slider. Bending and twisting of the slider causes a net displacement of the magnetic transducer, and such net displacement adversely affects transducer performance. Unintended transducer displacement causes the transducer to read from the wrong track or to be improperly positioned over the disc. This prevents the transducer from effectively reading data from and writing data to the magnetic disc which adversely effects the performance of the computer system.

The effects of thermal distortion at the head gimbal assembly is well known in the disc drive industry. There are two methods for addressing this problem, and both methods fall with disfavor. In prior art disc drives, the effect of thermal distortion is reduced by minimizing the contact area between the gimbal and the slider or by choosing a soft adhesive to reduce the net elastic displacement experienced by the support interface. These methods, however, are tedious to implement and rely on mature manufacturing processees. Therefore, there is a continuing need for head gimbal assembly which reduces the effects of thermal distortion yet can be relatively easily manufactured.

SUMMARY OF THE INVENTION

The present invention is directed to a head gimbal assembly which effectively reduces the membrane forces and membrane moments generated between the slider and the gimbal by adding geometric patterns distributed on the gimbal support. The head gimbal assembly of the present invention comprises the support coupled to the slider at an interface wherein the support includes a plurality of spaced apart markings or etchings at the interface. The head gimbal assembly of the present invention provides for localized deformations of the slider which avoid the bulk deformations that cause undesirable transducer displacement.

BRIEF DESCRIPTION OF THE DRAWINGS

FIG. 1 is a plan view of a load arm supporting a head gimbal assembly embodying features of the present invention over a magnetic disc.

FIG. 2 is a perspective view of the load arm and head gimbal assembly of FIG. 1.

DETAILED DESCRIPTION OF THE PREFERRED EMBODIMENTS

Figure 3:
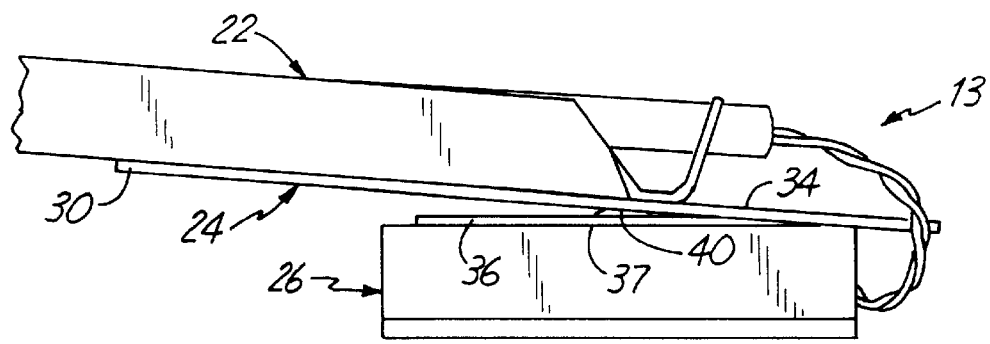
FIG. 3 is a more detailed side view of the load arm and head gimbal assembly of FIG. 1.

FIG. 1 illustrates an actuator 10 and an actuator arm 12 which supports a head gimbal assembly 13 over a magnetic disc 16. The actuator 10 positions the arm 12 along an arc 14 over the magnetic disc 16. The arm 12 includes a supporting arm 18, a base plate 20, and a load arm 22. The head gimbal assembly 13 includes a gimbal 24 and a slider 26. The arm 12 is known as the rotary actuating arm because the actuator 10 rotates the arm 12 to position the slider 26 along the arc 14.

FIG. 2 is a perspective view of the load arm 22 supporting the head gimbal assembly 13, as viewed from beneath the load arm 22 in FIG. 1. The gimbal 24 resiliently supports the slider 26 over the disc 16. As the disc 16 rotates, the slider 26 flies over the surface of the disc 16. The gimbal 24 allows the slider 26 to pitch and roll while the slider 26 follows the topography of the disc 16.

FIG. 3 is a side elevation view of the load arm 22 and the head gimbal assembly 13. The head gimbal assembly 13 includes the slider 26 and the gimbal 24. The elongated member 30 of the gimbal 24 is secured to the load arm 22 in a known manner. In one preferred embodiment of the present invention, the slider 26 is secured to a tongue 36 by an adhesive connection at interface 37. When the head gimbal assembly 13 is secured to the load arm 22, pivot 40 forces the tongue 36 and the slider 26 downward and into a "loaded" position. In the loaded position, the pivot 40 provides a surface about which the slider 26 can pitch and roll while it follows the topography of the disc 16.

Figure 4:
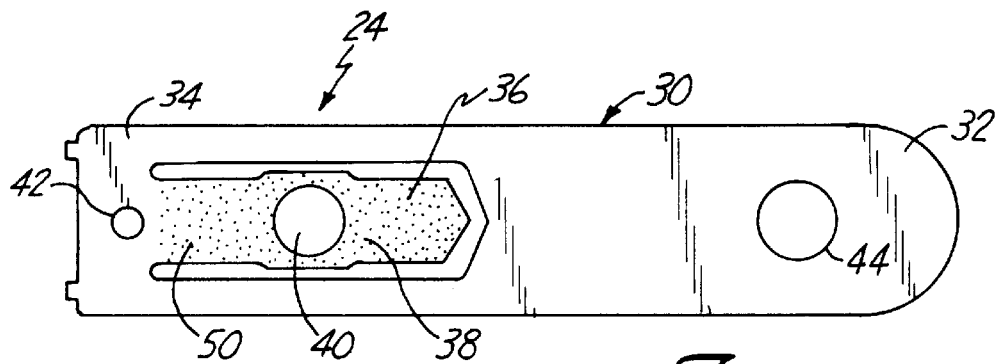
FIG. 4 is an enlarged plan view of the gimbal shown in FIG. 1.

FIG. 4 is an enlarged plan view of the gimbal 24 embodying features of the present invention. The gimbal 24 includes a resilient, elongated member 30 having a rearward position 32 and a forward position 34. A cantilevered tongue 36 is cut from a central region of the forward position 34. The tongue 36 includes a central pad 38. A pivot 40 is formed from the central pad 38 for point contact with the load arm 22 (as shown in FIG. 3). Apertures 42 and 44 are provided for aligning the gimbal 24 with the load arm 22. The gimbal 24 is shown with a plurality of spaced-apart geometric patterns 50 preferably randomly distributed on the central pad 38 to which the slider 26 is adhered at interface 37. Such geometric patterns 50 can be holes, as shown, recesses or depressions, markings or features that which otherwise create "discontinuities" in the central pad 38.

Figure 4A:
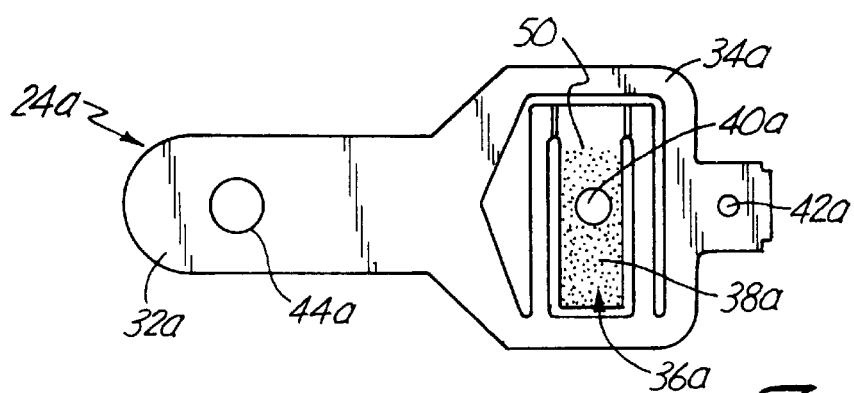
FIG. 4A is an enlarged plan view of another gimbal embodying features of the present invention.

FIG. 4A is an enlarged plan view of another gimbal 24a, which is typically called a 90° gimbal, embodying features of the present invention. The 90° gimbal has a rearward portion 32a and a forward portion 34a. A cantilevered tongue 36a is cut from a section of the 90° gimbal 24a proximate the forward portion 34a. The tongue 36a includes a central pad 38a and a pivot 40a for point contact with a load arm (not shown). Apertures 42a and 44a are provided for aligning the 90° gimbal 24a with a load arm (not shown). The central pad 38a also includes a plurality of geometric patterns 50, creating "discontinuities" as described above, which are preferably randomly distributed thereon.

As suggested by FIGS. 4 and 4A, a gimbal may assume a wide variety of configurations. As such, a gimbal may or may not include a central pad 38 or 38a for affixation of the slider 26 thereto. Those skilled in the art can contemplate a number of means for attaching the slider 26 to a gimbal. Thus, the portion of the gimbal attached to the slider 26 is generically referred to in the art as a "suspension" or "support". It is to be understood that the present invention can be practiced with a support, and not limited to use only on gimbals 24 and 24a having a tongue 36 or 36a with a central pad 38 or 38a.

Figure 5:
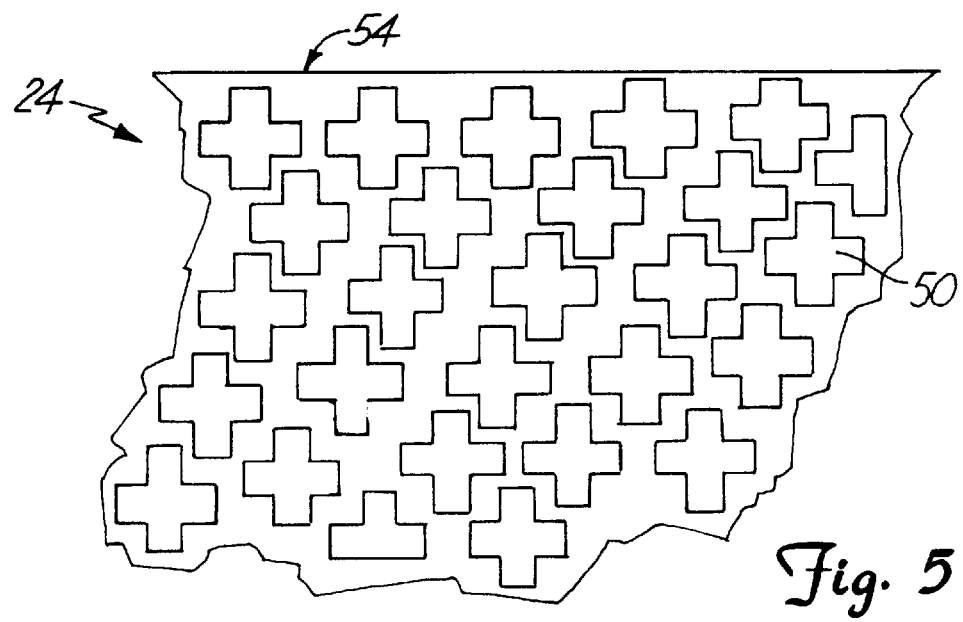
FIG. 5 is a schematic partial plan view of a portion of a gimbal embodying features of the present invention.

FIG. 5 is schematic plan partial view of the central pad 38, or the like, which will generically be referred to as a "support", generally referred to as reference numeral 54, and which is used to interface the gimbal 24 with the slider. In this example, the geometric patterns 50 are uniform size cross-like holes which are distributed preferably randomly on the central pad 38. The cross-like holes are preferred because their geometry permits the holes to be positioned closer together than circular-like holes. In other words, the overall area which is the central pad 38 is less than if the geometric patterns 50 were circles, as shown in the embodiments of FIG. 4 and 4A.

Figure 5A:
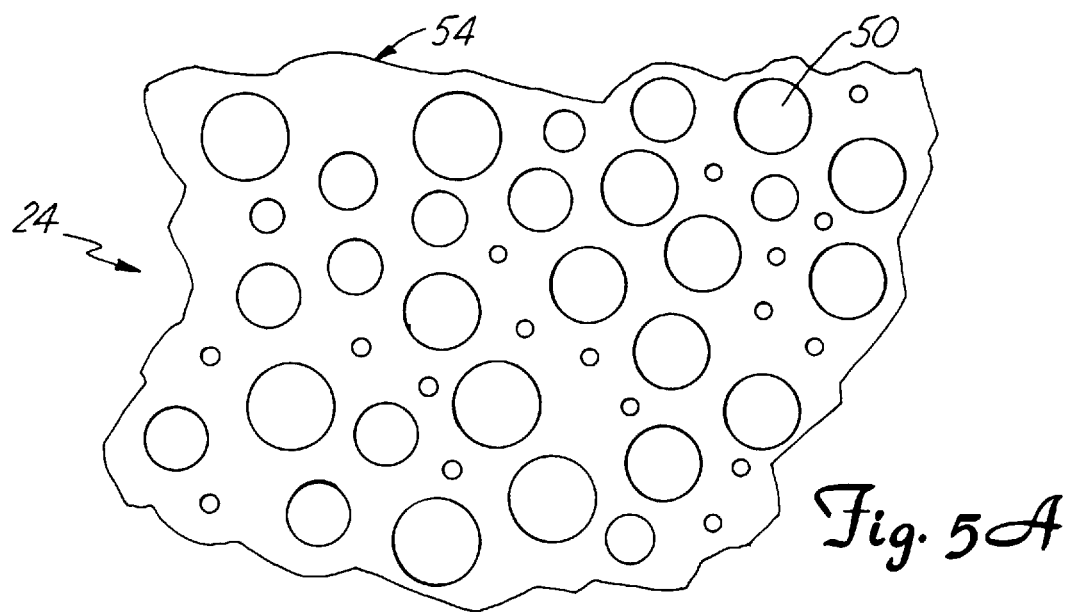
FIG. 5A is a schematic partial plan view of a portion of another gimbal embodying features of the present invention.
Figure 5B:
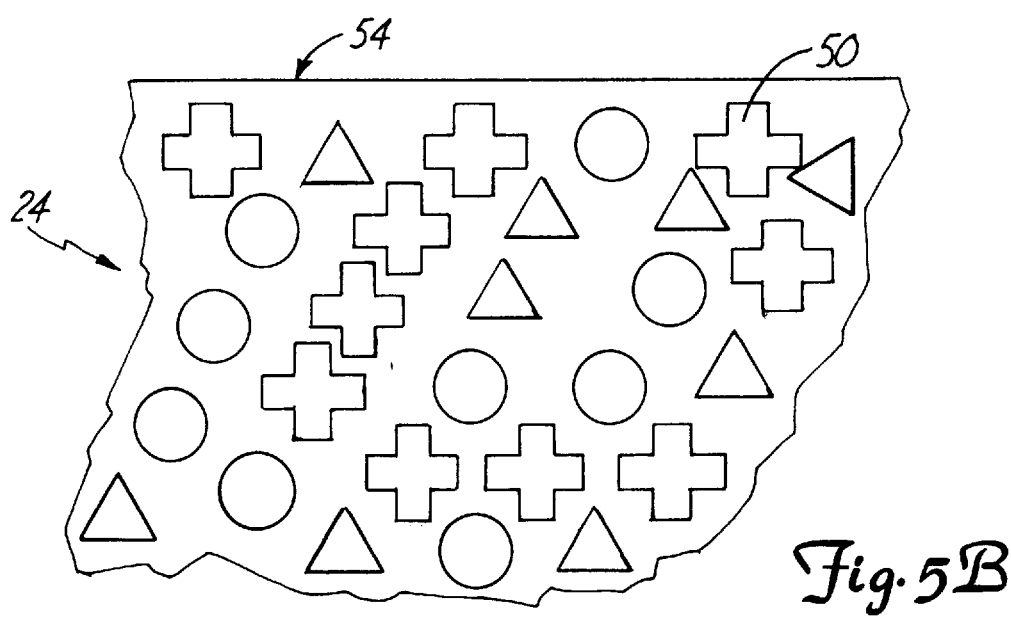
FIG. 5B is a schematic partial plan view of a portion of another gimbal embodying features of the present invention.

FIGS. 5A and 5B show two other contemplated embodiments of the present invention in partial plan views of the support 54. In FIG. 5A, the geometric patterns 50 are of varying size. The size can be randomly selected, of course. In FIG. 5B, the geometric patterns 50 are of varying shape. Of course, embodiments are contemplated wherein the size, shape and distribution of the geometric patterns 50 can be selected.

Figure 6:
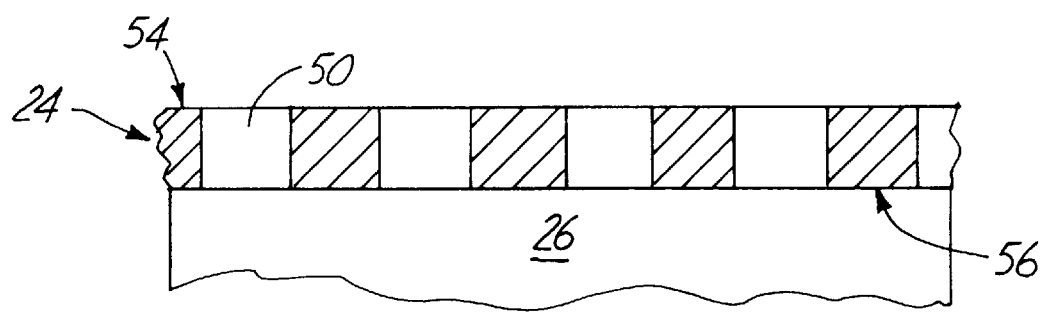
FIG. 6 is a schematic partial side view of a portion of a gimbal embodying features of the present invention, sectioned for clarity.
Figure 7:
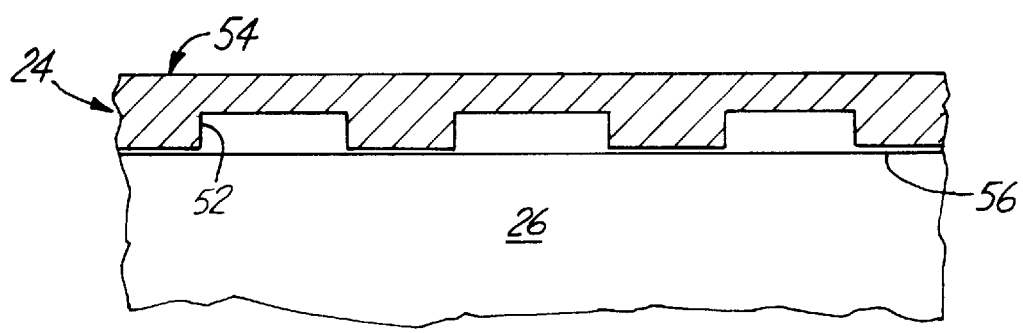
FIG. 7 is a schematic partial side view of another gimbal embodying features of the present invention, sectioned for clarity.
Figure 7A:
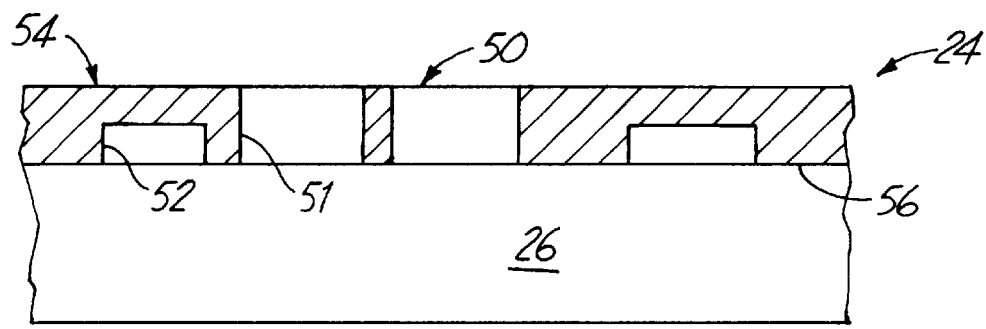
FIG. 7A is a schematic partial plan view of a portion of another gimbal embodying features of the present invention.

FIGS. 6, 7 and 7A show schematic side view cross-sections of a support 54, or the like, used to attach the gimbal 24 with the slider 26 at interface 56. The geometric patterns 50 can be etched into the support during fabrication of the gimbal 24. The geometric patterns 50 can be either fully etched so as to create holes 51 through the support 54 as shown in FIG. 6, or partially etched so as to create depressions 52 as shown in FIG. 7, or a combination of partially etched depressions 52 or holes 51 as shown in FIG. 7A. Partial etching of depressions 52 is preferred in order to handle excess adhesive used in securing the slider 26 to the gimbal 24. Preferably, the geometric patterns 50 are 100 to 150 microns in diameter. This size is chosen because it is suited for use with standard etching techniques. As standard etching techniques become better suited to create holes or depressions of smaller diameter on the support 54, it is expected that hole size will decrease in diameter and a greater number of geometric patterns can be placed on the support 54.

Figure 8:
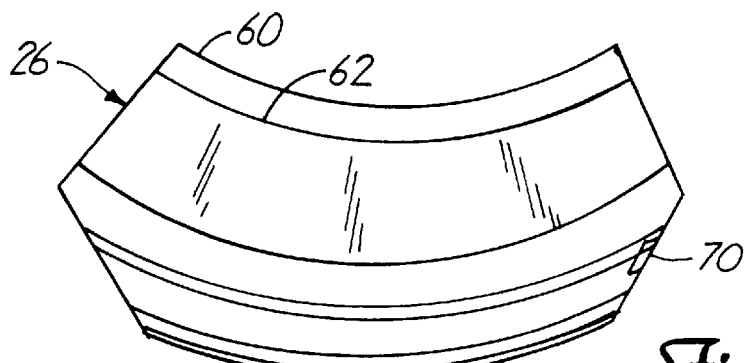
FIG. 8 is a schematic side view of a prior art head gimbal assembly depicting bulk deformation due to thermal stress.

FIG. 8 shows a side schematic view of a support 60 and slider 26 of the prior art under thermal stress. Because the thermal expansion coefficients of the slider and the gimbal are substantially different, the elastic displacements at an interface 62 cause a net elastic displacement responsible for bending and twisting the slider. Such exaggerated bulk deformation results in an unduly large net displacement to a transducer 70 attached thereto.

Figure 9:
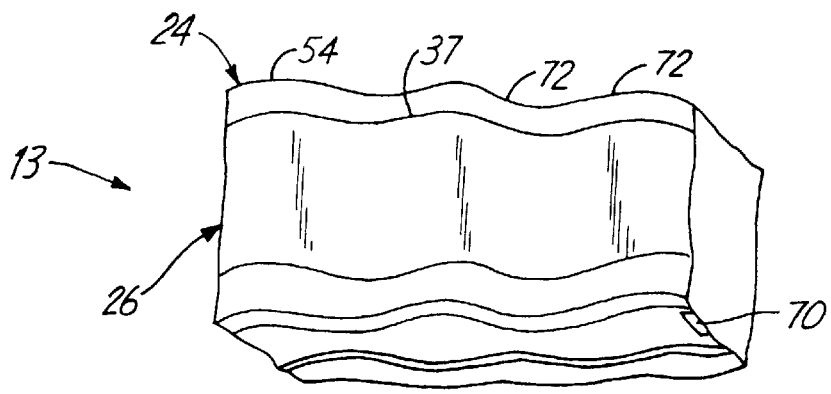
FIG. 9 is a schematic side view of a head gimbal assembly embodying features of the present invention and depicting localized deformations as a result of there al stress.

FIG. 9 shows a schematic side view of a head gimbal assembly 13 of the present invention wherein the gimbal 24 is attached to the slider 26 at support 54 and under thermal stress. The addition of patterns 50 to the support 54 create a large number of discontinuities and pivot points where the stresses are distributed randomly throughout the interface 56, or contact area, with no preferred orientation. It is desirable to create a large number of discontinuities, as effected by the geometric patterns 50, randomly distributed on the support 54 so as not to create any preferred direction for the membrane moments and forces to be generated. Localized deformations, as indicated generally at 72, of the slider 26 due to the geometric patterns 50, avoid the bulk deformation of the prior art.

The present invention is expected to reduce membrane forces and moments acting on the slider due to thermal stress. The result is a reduced net displacement of the transducer 70 thus reducing adverse effects on transducer performance.

Also, because the geometric patterns 50, can be etched directly during the fabrication of the gimbal spring 24, no additional cost to the parts is expected, such as using a more expensive soft adhesive as in the prior art. The geometric patterns 50 or 52 can be laser ablated, punched, etched, pinched or otherwise perforated. Portions of support 54 can be masked with a desired pattern. The unmasked portions of the support 54 are etched to leave the desired pattern in the support 54. The displacement and rotation of the support 54 is proportional to the modulus of elasticity of the material and to the thickness cubed and linearly proportional to the width and length of the support.

Although the present invention has been described with reference to preferred embodiments, workers skilled in the art will recognize that changes may be made in form and detail without departing from the spirit and scope of the invention.

What is claimed is:

1. A head gimbal assembly for a magnetic disc drive, comprising:
   a slider;
   a gimbal having an interface, defining a plane, attached to the slider; and
   discontinuity means for localizing deformation of the slider and gimbal when the head gimbal assembly is subjected to thermal stress, the discontinuity means positioned whereby any linear cross section through the gimbal interface perpendicular to the plane of the interface intersects the discontinuity means.

2. A head gimbal assembly for a magnetic disc drive, comprising:
   a slider formed of a material having a first coefficient of thermal expansion;
   a gimbal formed of a material having a second coefficient of thermal expansion different from the first coefficient of thermal expansion, the gimbal having an interface attached to the slider, wherein the interface has a bonding area defining a plane and fixing the gimbal to the slider which includes a plurality of discontinuities positioned whereby any linear cross section through the bonding area and perpendicular to the plane includes at least one discontinuity; and
   wherein the discontinuities are spaced and sized to reduce thermal stresses between the slider and the gimbal.

3. The head gimbal assembly of claim 1 wherein the gimbal includes a support, wherein the interface is at the support.

4. The head gimbal assembly of claim 3 wherein the plurality of discontinuities includes a plurality of recesses in the support.

5. The head gimbal assembly of claim 4 wherein the plurality of recesses are randomly distributed on the support.

6. The head gimbal assembly of claim 3 wherein the plurality of discontinuities includes a plurality of holes through the support.

7. The head gimbal assembly of claim 6 wherein the plurality of holes are randomly distributed about the support.

8. The head gimbal assembly of claim 3 wherein the slider is attached to the support via an adhesive.

9. A gimbal for use with a slider formed of a material having a first coefficient of thermal expansion, the gimbal comprising:
   a support formed of a material having a second coefficient of thermal expansion different from the first coefficient of thermal expansion, the support hating an interface which has a bonding area defining a plane, the interface adapted to be coupled to the slider, wherein the support includes a plurality of spaced-apart discontinuities positioned whereby any linear cross section through the plane perpendicular to the plane of the bonding area includes at least one discontinuity, and wherein the discontinuities are sized and spaced to reduce thermal stresses between the slider and the support.

10. The gimbal of claim 9 wherein the discontinuities are randomly distributed on the support.

11. The gimbal of claim 10 wherein the discontinuities include holes through the support.

12. The gimbal of claim 9 wherein the discontinuities include recesses in the support.

13. A magnetic disc drive system, comprising:
   a magnetic storage disc;
   an actuator arm having a head gimbal assembly attached thereto, the head gimbal assembly formed of a material having a first coefficient of thermal expansion wherein the head gimbal assembly includes a transducer formed of a material having a second coefficient of thermal expansion, the transducer attached to the head gimbal assembly and disposed adjacent to the disc; and
   wherein the head gimbal assembly includes a support having a bonding area defining a plane and coupling the head gimbal assembly to the transducer, the support including a plurality of discontinuities for permitting localized deformation when the transducer and support are subjected to thermal stress, which discontinuities are positioned whereby any linear cross section through the bonding area and perpendicular to the plane includes at least one discontinuity.

14. The magnetic disc drive system of claim 13 wherein the discontinuities are formed by a plurality of geometric patterns which extend through the support.

15. The magnetic disc drive system of claim 13 wherein the discontinuities are formed by a plurality of geometric patterns which are recessed in the support.

16. The magnetic disc drive system of claim 13 wherein the discontinuities are randomly distributed on the support.

* * * * *